US012752272B2

(12) United States Patent
Lin et al.

(10) Patent No.: US 12,752,272 B2
(45) Date of Patent: Oct. 6, 2026

(54) SEQUENCING SYSTEMS INCLUDING A BASE UNIT AND REMOVABLE CARTRIDGE

(71) Applicant: EGI Tech (Qing Dao) Co., Limited, Shandong (CN)

(72) Inventors: Sz-Chin Lin, San Jose, CA (US); Cheng Frank Zhong, Menlo Park, CA (US); Yiwen Ouyang, San Jose, CA (US); Sixing Li, Mountain View, CA (US); Daqing Liu, San Carlos, CA (US)

(73) Assignee: EGI Tech (Qing Dao) Co., Limited, Shandong (CN)

( * ) Notice: Subject to any disclaimer, the term of this patent is extended or adjusted under 35 U.S.C. 154(b) by 1328 days.

(21) Appl. No.: 17/509,365

(22) Filed: Oct. 25, 2021

(65) Prior Publication Data

US 2022/0134336 A1 May 5, 2022

Related U.S. Application Data

(60) Provisional application No. 63/107,712, filed on Oct. 30, 2020.

(51) Int. Cl.
*B01L 3/00* (2006.01)
*B01L 9/00* (2006.01)
(Continued)

(52) U.S. Cl.
CPC ......... *B01L 3/502715* (2013.01); *B01L 9/527* (2013.01); *G01N 21/6456* (2013.01); (Continued)

(58) Field of Classification Search
CPC ............... B01L 9/527; B01L 3/502715; G01N 21/6456; G01N 21/6486; G01N 35/00029; G01N 35/00732; G01N 35/0099
See application file for complete search history.

(56) References Cited

U.S. PATENT DOCUMENTS 12,083,520 B2 9/2024 Lin et al.
2009/0246085 A1 10/2009 Watson et al.
(Continued)

FOREIGN PATENT DOCUMENTS

CN 101368206 A 2/2009
CN 101802164 A 8/2010
(Continued)

OTHER PUBLICATIONS

International Application No. PCT/CN2021/127003, International Search Report and Written Opinion mailed on Jan. 27, 2022, 12 pages.

(Continued)

*Primary Examiner* — Charles Capozzi
*Assistant Examiner* — Tingchen Shi
(74) *Attorney, Agent, or Firm* — Kilpatrick Townsend & Stockton LLP

(57) ABSTRACT

Embodiments include systems for sequencing a biological sample. The system may include a reusable subsystem and a removable subsystem. The reusable subsystem may actuate and operate the removable subsystem to automate the sequencing. A base unit of the reusable subsystem may form a fluidic connection between an integrated reagent cartridge and an integrated sensor cartridge of the removable subsystem. The integrated reagent cartridge may be configured to hold reagents and the integrated sensor cartridge may be configured with a biosensor for sequencing the biological sample.

23 Claims, 8 Drawing Sheets

(51) Int. Cl.

*G01N 21/64* (2006.01)
*G01N 35/00* (2006.01)
*G01N 21/17* (2006.01)
*G01N 35/04* (2006.01)

(52) U.S. Cl.

CPC ... *G01N 21/6486* (2013.01); *G01N 35/00029* (2013.01); *G01N 35/00732* (2013.01); *G01N 35/0099* (2013.01); *G01N 2021/1765* (2013.01); *G01N 2021/6482* (2013.01); *G01N 2035/00158* (2013.01); *G01N 2035/00237* (2013.01); *G01N 2035/00326* (2013.01); *G01N 2035/00356* (2013.01); *G01N 2035/0465* (2013.01)

(56) References Cited

U.S. PATENT DOCUMENTS

| | | | |
|---|---|---|---|
| 2009/0249949 | A1 | 10/2009 | Kepler et al. |
| 2009/0269246 | A1 | 10/2009 | Hasegawa |
| 2011/0004187 | A1 | 1/2011 | Beiriger |
| 2014/0073517 | A1 | 3/2014 | Zhou et al. |
| 2016/0184826 | A1 | 6/2016 | Nemoto et al. |
| 2019/0038196 | A1* | 2/2019 | Young .............. A61B 5/150022 |
| 2019/0283024 | A1* | 9/2019 | Aravanis ............. F16K 99/0028 |
| 2019/0376993 | A1 | 12/2019 | Accurso |
| 2020/0115666 | A1 | 4/2020 | Goral et al. |
| 2020/0171502 | A1 | 6/2020 | Kumar et al. |

FOREIGN PATENT DOCUMENTS

| | | | |
|---|---|---|---|
| CN | 105142789 | A | 12/2015 |
| CN | 106536055 | A | 3/2017 |
| WO | 2014149277 | A2 | 9/2014 |
| WO | 2015183871 | A1 | 12/2015 |

OTHER PUBLICATIONS

European Application No. 21885253.1, Extended European Search Report mailed on Sep. 10, 2024, 8 pages.

* cited by examiner

SEQUENCING SYSTEMS INCLUDING A BASE UNIT AND REMOVABLE CARTRIDGE

RELATED APPLICATIONS

This application claims priority to and the benefit of the filing date of U.S. Provisional Patent Application Ser. No. 63/107,712, filed Oct. 30, 2020 for "Sequencing Systems Including a Base Unit and Removable Cartridge," the entire contents of which are hereby incorporated by this reference.

RELATED FIELDS

Devices and methods of nucleic acid sequencing, and more particularly reagent cartridges and sensor cartridges for use in sequencing.

BACKGROUND

As nucleic acid sequencing technologies have advanced, there has been an effort in reducing the complexity and cost of sequencers. Many of these technologies utilize microfluidics, which deals with the behavior, precise control, and manipulation of fluids that may be geometrically constrained to a small, typically sub-millimeter, scale at which capillary penetration governs mass transport.

Sequencing is the process of determining the nucleic acid sequence, or the order of nucleotides, such as in DNA. DNA sequencing includes methods or technologies that are used to determine the order of the four base nucleotides: adenine, guanine, cytosine, and thymine. Knowledge of DNA sequences has become indispensable for basic biological research, and in numerous applied fields such as medical diagnosis, biotechnology, forensic biology, virology and biological systematics. Comparing healthy and mutated DNA sequences can diagnose different diseases including various cancers, characterize antibody repertoire, and can be used to guide patient treatment. Having a quick way to sequence DNA allows for faster and more individualized medical care to be administered, and for more organisms to be identified and cataloged.

BRIEF SUMMARY

In this patent, we describe systems and methods for DNA and other nucleic acid sequencing. The systems and methods may include a reusable base unit and removable cartridges. The removable cartridges can include an integrated reagent cartridge (IRC) and an integrated sensor cartridge (ISC).

There are many approaches to nucleic acid (e.g., DNA) sequencing, e.g., massively parallel sequencing. See, e.g., Kumar, K., 2019, "Next-Generation Sequencing and Emerging Technologies," *Semin Thromb Hemost* 45(07): 661-673. Conventional sequencing systems typically encounter a number of challenges. For example, many conventional sequencing systems are not portable and, due to their size, are expensive. Many conventional sequencing systems also require an external light source, lasers, cameras, and stages to accurately read and sequence a DNA sample. Embodiments disclosed herein include sensor cartridges that can allow easy reconfiguration of the sequencing system. For example, the sensor cartridge can have a larger or smaller sensor area, different microfluidic channel configurations, or other attributes that may be beneficial depending on the particular workflow. Additionally, the reagent cartridges and sensor cartridges be stored separately from the base unit. When an end-user requires the reagents and sensor, the reagent cartridge and sensor cartridge may be engaged with the base unit to deliver the reagents and sequence DNA or other nucleic acid samples on demand. In some example implementations, this system allows for various sequencing applications of different reads length (30 bp to 700 bp) and reads throughput (4M to 500 M) in a short turn-around time (3 hr to 48 hr).

Embodiments disclosed herein may offer a number of advantages over more conventional solutions. For example, the sequencing system can provide proper sequencing reagent storage for off-board conditions (e.g., light prevention, frozen, air tight) and on-board conditions (e.g., light prevention, suitable temperature, oxygen permeation, light prevention), to ensure optimal chemical reactivity of the reagents, along with proper sequencing reagent handling that prevents run-to-run contamination and corrosion to the base unit. As another example, the sequencing system provides the capability to accept and capture nucleic-acids that are of sequencing interest in a liquid sample format. Additionally, the sequencing system provides a proper combination of sequencing reagents releasing function when being operated by the base unit. As a result, all the reagents are dispensable and available for the sequencing reaction during the sequencing reactions. As another example, the sequencing system provides proper sequencing reagent delivery function, such that all the reagents can be programmed and be delivered to the sequencing reaction site on time with certain volume accuracy and without the risk of sensitive reagent cross contamination. As another example, the sequencing system provides proper sequencing temperature that allows the optimum sequencing reaction kinetics. Additionally, the sequencing system provides detection function to sequencing reaction events and converts the signal to a digital data format. As another example, the sequencing system provides automated sequencing base calling and related bioinformatic functions, which includes, but is not limited to, decoding the raw sequencing signal data to nucleic acid base sequence, base call quality controls, reads alignment and genome/transcript assembly, and feature detection and quantification.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

In one example, a system may include: (a) a removable integrated sensor cartridge (ISC), having: (i) a fluidic network, including: a sample reservoir to receive a biological sample; a reaction chamber having at least one biosensor and an opaque surface, the opaque surface spaced apart from the at least one biosensor; a plurality of reagent receiving ports; and a plurality of fluidic channels connecting the biological sample and reagents to the reaction chamber; (ii) a reagent select valve, including: a plurality of valve ports; an output channel fluidically connected to the reaction chamber; and a bridge channel configured to fluidically couple one of a plurality of valve ports to the output channel; (iii) a biosensor assembly, including: the at least one biosensor with an array of detectors for detecting biological analytes on or near its functionalized surface; a substrate with electrical IO pads, providing connection to the at least one biosensor and an electric connector assembly of a base unit; and a plurality of electrical connections that connect the at least one biosensor to IO pads of the substrate; (b) a removable integrated reagent cartridge (IRC), having: (i) a cartridge housing, including: a plurality of fluidic connectors at a bottom surface configured to fluidically couple to the reagent receiving ports of the removable integrated sensor cartridge (ISC); (ii) a plurality of reagent reservoirs disposed within the cartridge housing; and (iii) a waste container disposed within the cartridge housing; (c) the base unit, having: (i) a pump assembly to fluidically connect to the removable integrated sensor cartridge (ISC) and the removable integrated reagent cartridge (IRC); (ii) a valve actuator to engage the reagent select valve of the removable integrated sensor cartridge (ISC); and (iii) the electric connector assembly to control and receive data from the biosensor assembly of the removable integrated sensor cartridge (ISC); wherein the removable integrated sensor cartridge (ISC), the removable integrated reagent cartridge (IRC), and the base unit are operably coupled to each other to collectively define system interfaces, with at least one of a fluidic coupling, an electric coupling, or a thermal coupling established through the system interfaces.

In this example, the reaction chamber may have a plurality of reaction sites.

In this example, a functionalized surface of the biosensor can have a plurality of active sensing areas.

In this example, the biosensor may be a CMOS image sensor with functionalized surface.

In this example, the opaque surface of the reaction chamber may be a second biosensor surface.

In this example, the base unit may have a cooling unit fluidically connected to the removable integrated reagent cartridge to actively chill the reagents.

In this example, the base unit may have a TEC unit engaged to the removable integrated sensor cartridge (ISC) to control a temperature of the reaction chamber.

In this example, the waste container may be a standalone part interfacing directly to the pump assembly of the base unit.

In this example, the cartridge housing may have at least one opening to receive at least one reagent used for reaction.

In this example, the removable integrated sensor cartridge (ISC) may include a disposable pump.

In another example, a system includes: (a) a removable integrated sensor cartridge (ISC), having: (i) a fluidic network, including: a sample reservoir to receive a biological sample; a reaction chamber having at least one biosensor and an opaque surface, the opaque surface spaced apart from the at least one biosensor; a plurality of reagent receiving ports; and a plurality of fluidic channels connecting the biological sample and reagents to the reaction chamber; (ii) a reagent select valve, including: a plurality of valve ports; an output channel fluidically connected to the reaction chamber; and a bridge channel configured to fluidically couple one of the plurality of valve ports to the output channel; (iii) a biosensor assembly, including: the at least one biosensor with an array of detectors for detecting biological analytes on or near its functionalized surface; a substrate with electrical IO pads, providing connection to the at least one biosensor and an electric connector assembly of a base unit; and a plurality of electrical connects that connect the at least one biosensor to IO pads of the substrate; (b) a removable integrated reagent cartridge (IRC), having: (i) a cartridge housing, including: a plurality of fluidic connectors at a bottom surface configured to fluidically couple to the reagent receiving ports of the removable integrated sensor cartridge (ISC); (ii) a plurality of reagent reservoirs disposed within the cartridge housing; (iii) a disposable pump; (iv) a plurality of flow control valves; and (v) a waste container disposed within the cartridge housing; (c) the base unit, having: (i) a pump actuator to engage the disposable pump of the removable integrated reagent cartridge (IRC); (ii) a valve actuator to engage the flow control valves of the removable integrated reagent cartridge (IRC); (iii) another valve actuator to engage the reagent select valve of the removable integrated sensor cartridge (ISC); and (iv) the electric connector assembly to control and receive data from the biosensor assembly of the removable integrated sensor cartridge (ISC); wherein the removable integrated sensor cartridge (ISC), the removable integrated reagent cartridge (IRC), and the base unit are operably coupled to each other to collectively define system interfaces, with at least one of a fluidic coupling, an electric coupling, or a thermal coupling established through the system interfaces.

In this example, the plurality of flow control valves may be part of the removable integrated sensor cartridge (ISC).

In this example, the waste container may be a standalone part interfacing directly to a pump assembly of the removable integrated reagent cartridge (IRC).

In another example, a sequencing system includes: (a) a removable integrated reagent cartridge (IRC), the IRC including one or more reservoirs for holding one or more sequencing reagents, the IRC further including one or more connectors in fluid communication with the one or more reservoirs; (b) a removable integrated sensor cartridge (ISC), the ISC including: (i) one or more reagent receiving ports, the reagent receiving ports located to fluidically connect to the one or more connectors of the IRC when the IRC is brought into engagement with the ISC; (ii) at least one biological sample input; (iii) a reaction chamber including at least one sensor comprising a functionalized surface and an array of detectors configured to detect biological analytes on or near the functionalized surface; (iv) a fluidic network configured to selectively fluidically connect the reagent receiving ports and biological sample input to the reaction chamber; and (c) a base unit configured to removably receive the IRC and the ISC, the base unit configured to control sequencing reactions in the reaction chamber and to receive sequencing data from the sensor when the IRC and ISC are loaded into the base unit.

In this example, the fluidic network may include a multi-position valve that selectively connects the reagent receiving ports and the biological sample input to the reaction chamber, and the base unit may include a valve actuator configured to actuate the multi-position valve.

In this example, the multi-position valve includes a plurality of valve ports fluidically connected to the reagent receiving ports and the biological sample input, an output channel fluidically connected to the reaction chamber; and a re-positionable bridge channel configured to fluidically couple one of a the plurality of valve ports to the output channel.

In this example, the biological sample input may include a sample reservoir on the ISC configured to receive the biological sample.

In this example, the reaction chamber may include an opaque surface spaced apart from the at least one sensor.

In this example, the opaque surface of the reaction chamber may be a second biosensor.

In this example, the sensor further comprises a substrate including electrical contacts electrically coupled to the array of detectors, wherein the base unit further comprises an electrical connector assembly configured to electrically connect to the electrical contacts to receive sequencing data from the sensor.

In this example, the IRC may have a housing, with the reservoirs located within the housing, and the IRC may also include a waste container located within the housing configured to receive used sequencing reagent.

In this example, the system may instead have a separate waste container configured to receive used sequencing reagent.

In this example, the base unit may include a pump assembly configured to fluidically connect to the ISC and the IRC.

In this example, the IRC may instead include a disposable pump, with the base unit including a pump actuator configured to engage the disposable pump.

In this example, the reaction chamber may include a plurality of reaction sites.

In this example, the functionalized surface of the sensor may include a plurality of active sensing areas.

In this example, the sensor may be a CMOS image sensor adjacent the functionalized surface.

In this example, the base unit may also include a cooling unit fluidically connected to the IRC configured to actively chill the reagents.

In this example, the base unit may include a temperature control unit engaged to the ISC configured to control a temperature of the reaction chamber.

In this example, the IRC may also include at least one opening configured to receive at least one sequencing reagent.

In this example, the base unit may also include one or more actuators configured to open the one or more reservoirs of the IRC.

In this example, the IRC and ISC may be configured to be compressed together when loaded into the base unit.

In this example, the base unit may be configured to compress the IRC and ISC together.

In another example, a sequencing system may include: (a) a removable integrated reagent cartridge (IRC) configured to hold one or more sequencing reagents; (b) a removable integrated sensor cartridge (ISC) comprising a reaction chamber and at least one valve, the reaction chamber including at least one sensor electrically connected to a plurality of electrical contacts; and (c) a base unit, the system configured for removable installation of the IRC and ISC in the base unit, the base unit including a valve actuator and an electric connector assembly, with the base unit configured such that upon installation of the IRC and ISC in the base unit, the IRC is fluidically connected to the ISC, the valve actuator is operably engaged to the at least one valve of the ISC, and the electric connector assembly is electrically coupled to the plurality of electrical contacts of the ISC.

In this example, the at least one valve of the ISC may be a multi-position valve configured to selectively connect at least one of a plurality of reagent fluidic channels and a biological sample fluidic channel to the reaction chamber.

In this example, at least one of the IRC and ISC also include a plurality of additional flow control valves, and the base unit also includes at least one second valve actuator, and the base unit is configured such that upon installation of the IRC and ISC in the base unit, with the at least one second valve actuator operably engaged to the plurality of additional flow control valves.

In this example, at least one of the IRC and ISC may also include a disposable pump, in which the base unit includes a pump actuator, with the base unit configured such that upon installation of the IRC and ISC in the base unit, the pump actuator is operably engaged to the disposable pump.

In another example, an integrated sensor cartridge (ISC) is configured for removable installation in a base unit of a sequencing system and includes: (a) one or more reagent receiving ports; (b) at least one biological sample input; (c) a reaction chamber including at least one sensor comprising a functionalized surface and an array of detectors configured to detect biological analytes on or near the functionalized surface, the sensor including a substrate including electrical contacts electrically coupled to the array of detectors, the electrical contacts configured to electrically connect to the base unit when the ISC is installed in the base unit; and (d) a fluidic network configured to selectively fluidically connect the reagent receiving ports and biological sample input to the reaction chamber, the fluidic network including a multi-position valve that selectively connects the reagent receiving ports and the biological sample input to the reaction chamber, the multi-position valve configured for actuation by the base unit when the ISC is installed in the base unit.

In another example, a sequencing method uses a sequencing system with a base unit, a removable integrated reagent cartridge (IRC) including at least one sequencing reagent, and a removable integrated sensor cartridge (ISC) including a reaction chamber, the method including the steps of: (a) installing the IRC and ISC in the base unit; (b) engaging at least one valve actuator of the base unit with at least one valve of at least one of the IRC and the ISC; and (c) electrically connecting an electrical connector assembly of the base unit to electrical contacts of the ISC.

In this example, the at least one valve may be a multi-position valve that selectively connects one or more fluidic channels out of a plurality of channels to the reaction chamber, with the base unit configured to control the position of the multi-position valve using the at least one valve actuator.

In this example, at one of the IRC and ISC may include a disposable pump, with the base unit including a pump actuator, and in which the method includes engaging the pump actuator with the disposable pump.

In another example, an integrated fluidic cartridge includes: (a) a removable integrated reagent cartridge (IRC) including: (i) a cartridge housing, having a plurality of fluidic connectors at a bottom surface configured to fluidically couple to reagent receiving ports of a removable integrated sensor cartridge (ISC); (ii) a plurality of reagent reservoirs disposed within the cartridge housing; (iii) a disposable pump; (iv) a plurality of flow control valves; and (v) a waste container disposed within the cartridge housing; (b) the removable integrated sensor cartridge (ISC) having at least one opaque surface, the removable integrated sensor cartridge (ISC) including: (i) a fluidic network; (ii) a reaction chamber having at least one biosensor; and (iii) a biosensor assembly, which includes: the at least one biosensor with an array of detectors for detecting biological analytes on or near its functionalized surface; a substrate with electrical IO pads, providing connection to the at least one biosensor and an electric connector assembly of a base unit; and a plurality of electrical connects that connect the at least one biosensor to IO pads of the substrate.

In another example, a sequencing system includes: (a) a removable integrated cartridge having: (i) a reagent storage section configured to hold one or more sequencing reagents; (ii) a fluidics and sensing section comprising a reaction chamber and at least one valve, the reaction chamber including at least one sensor electrically connected to a plurality of electrical contacts; and (b) a base unit, the system configured for removable installation of the IRC and ISC in the base unit, the base unit including a valve actuator and an electric connector assembly, and the base unit is configured such that upon installation of the integrated cartridge in the base unit, the IRC is fluidically connected to the ISC, the valve actuator is operably engaged to the at least one valve of the ISC, and the electric connector assembly is electrically coupled to the plurality of electrical contacts of the ISC.

In another example, a sequencing system includes: (a) a removable integrated reagent cartridge (IRC) including at least one valve, the IRC configured to hold one or more sequencing reagents; (b) a removable integrated sensor cartridge (ISC) with a reaction chamber including at least one sensor electrically connected to a plurality of electrical contacts; and (c) a base unit, the system configured for removable installation of the IRC and ISC in the base unit, the base unit including a valve actuator and an electric connector assembly, and the base unit is configured such that upon installation of the IRC and ISC in the base unit, the IRC is fluidically connected to the ISC, the valve actuator is operably engaged to the at least one valve of the IRC, and the electric connector assembly is electrically coupled to the plurality of electrical contacts of the ISC.

BRIEF DESCRIPTION OF THE DRAWINGS

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

In the following detailed description, reference is made to the accompanying drawings which form a part hereof, and in which is shown by way of illustration specific embodiments in which the invention may be implemented. The terms "height," "top," "bottom," etc., are used with reference to the orientation of the figures being described. Because components of embodiments of the present invention can be positioned in a number of different orientations, the term is used for purposes of illustration and is not limiting.

As used herein a "sequencing event" refers to emission of an optical signal (e.g., a fluorescence or luminescence signal) resulting from a sequencing process. An exemplary sequencing process is a cycle of a sequencing-by-synthesis process. In this approach, nucleotides are incorporated into as primer extension product (e.g. using reversible terminator nucleotides). In this approach, nucleotides can be labeled with, for example, a fluorescent dye or a source of a luminescence signal (e.g. luciferase or luciferase substrate). A luminescent signal includes chemiluminescence and bioluminescence. A nucleotide can be labeled directly with a fluorescent dye or a source of a luminescence signal or can be associated with an antibody, aptamer or other agent labeled with a signal generating moiety. In the process of sequencing a defined optical signal is produced at each site in an array by, for example, illumination of the fluorescent dye(s) with an excitation wavelength, and the signals and corresponding positions are recorded.

Figure 1:
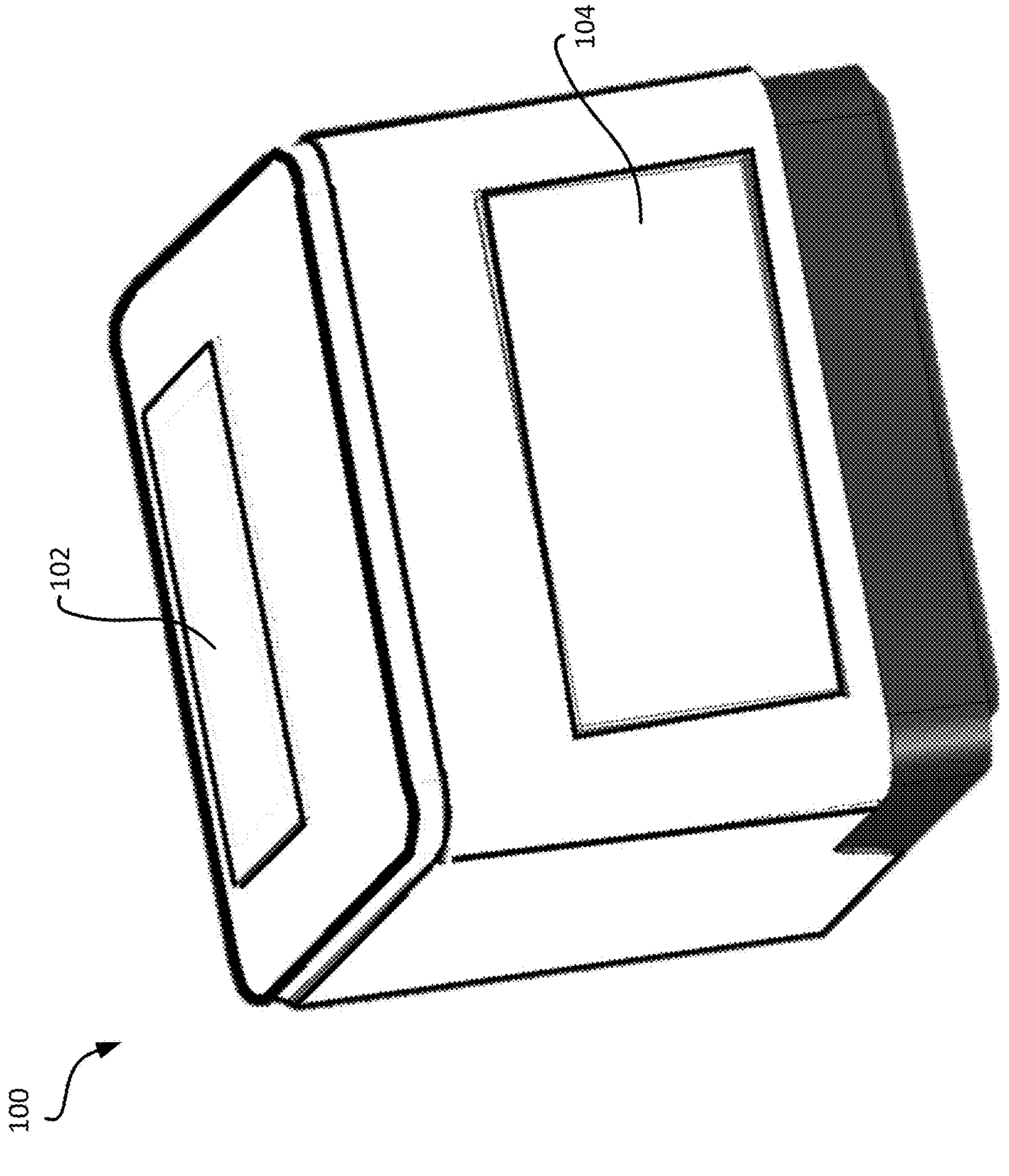
FIG. 1 illustrates an example of a base unit of a sequencing system.

FIG. 1 illustrates an example of a base unit 100 of a sequencing system. In some embodiments, the base unit 100 is a reusable subsystem of the sequencing system that can actuate and operate one or more removable subsystems (e.g., an integrated reagent cartridge (IRC) and an integrated sensor cartridge (ISC)). A fluidic coupling, an electric coupling, and/or a thermal coupling may be established through interfaces of the base unit 100, IRC, and ISC. For example, a pump assembly of the base unit 100 can fluidically couple the base unit 100 to the IRC and/or the ISC. The base unit 100 may additionally include one or more valve actuators to engage components of the IRC and the ISC. For example, a first valve actuator can engage flow control valves of the IRC and a second valve actuator can engage a reagent select valve of the ISC. In an example, the base unit 100 can include a loading area 104 with a door. Prior to sequencing, the removable subsystem can be inserted to the base unit 100 when the door is open.

In some embodiments, the base unit 100 includes modules for performing sequencing-related operations. A controller module of the base unit 100 can include a user interface 102 for selecting a sequencing workflow and otherwise providing for inputs and/or outputs of information. The user interface 102 may be a touchscreen or other interface capable of receiving a selection and/or displaying information. The controller module of the base unit 100 can communicate with additional modules of the base unit 100 during sequencing. For example, additional modules may include a loading module, one or more compressing modules, one or more thermal control modules, a reagent selection module, a reagent dispensing module, a sensor read out module, and a data storage and processing module. The loading module can control taking in and out the removable subsystem. The one or more compressing modules can engage the IRC, ISC, and/or components of the base unit 100 together. In an example, the one or more compressing modules can control piercing the IRC of the removable subsystem, compressing the IRC and the ISC to form a closed fluidic line, and pressing a thermoelectric cooler (TEC) and socket to a land grid array (LGA) of the ISC. The one or more thermal control modules can provide temperature adjustment for the IRC and the ISC. For example, the one or more thermal control modules can provide thermostat features to the IRC via a non-contact air cooling method and provide a temperature ramping feature to a reaction chamber of the ISC. The thermal control modules may additionally dynamically adjust the TEC temperature based on sensor reads out from the ISC. For example, the thermal control modules may include a cooling unit fluidically connected to the IRC to actively cool reagents. The reagent selection module can provide an actuation force to rotate a rotary valve of the ISC to a desired position. The reagent dispensing module can control a supply of reagents to the ISC. For example, the reagent dispensing module can provide a negative pressure to pull and meter a sequencing reagent using a reagent select valve and a motor-driven pump assembly. An electric connector assembly including the sensor reads out module and the data storage and processing module can control and receive data from a biosensor assembly of the ISC. The sensor reads out module can provide a connection to the LGA of the ISC to read an analog signal of the sequencing event and to read a temperature inside the reaction chamber. The sensor reads out module may additionally convert the analog signal to a digital format for data storage in the data storage and processing module.

Figure 2B:
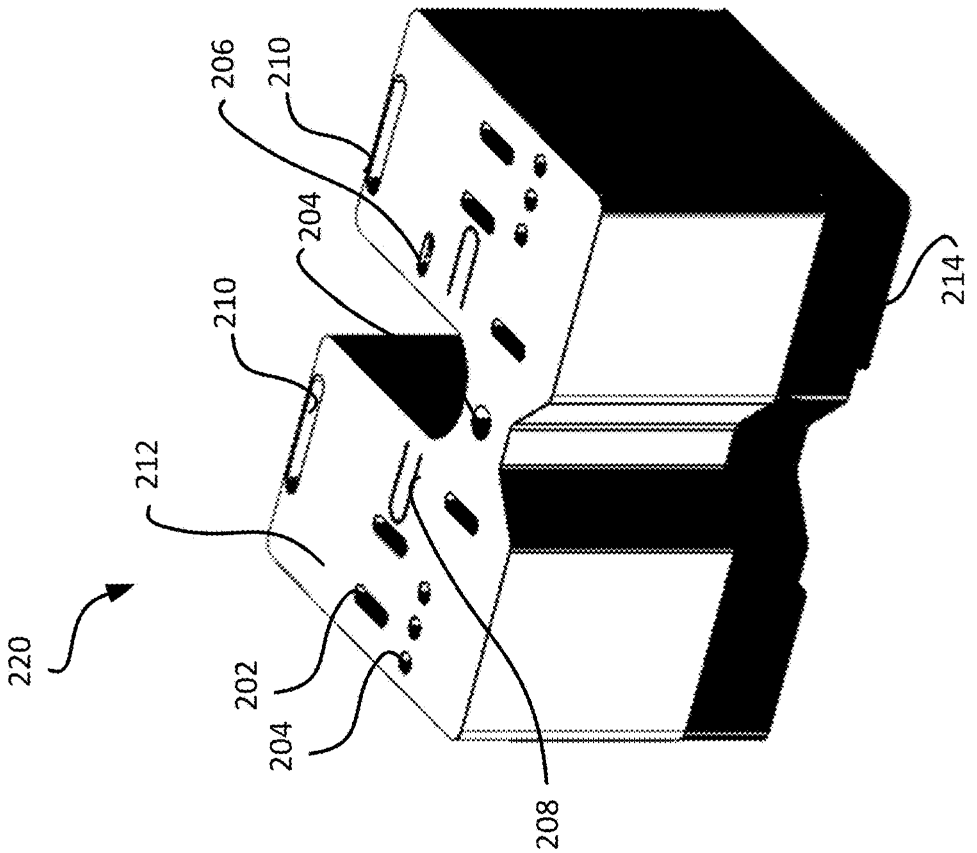
FIGS. 2A-2C illustrate an example of an integrated reagent cartridge of a sequencing system.
Figure 2A:
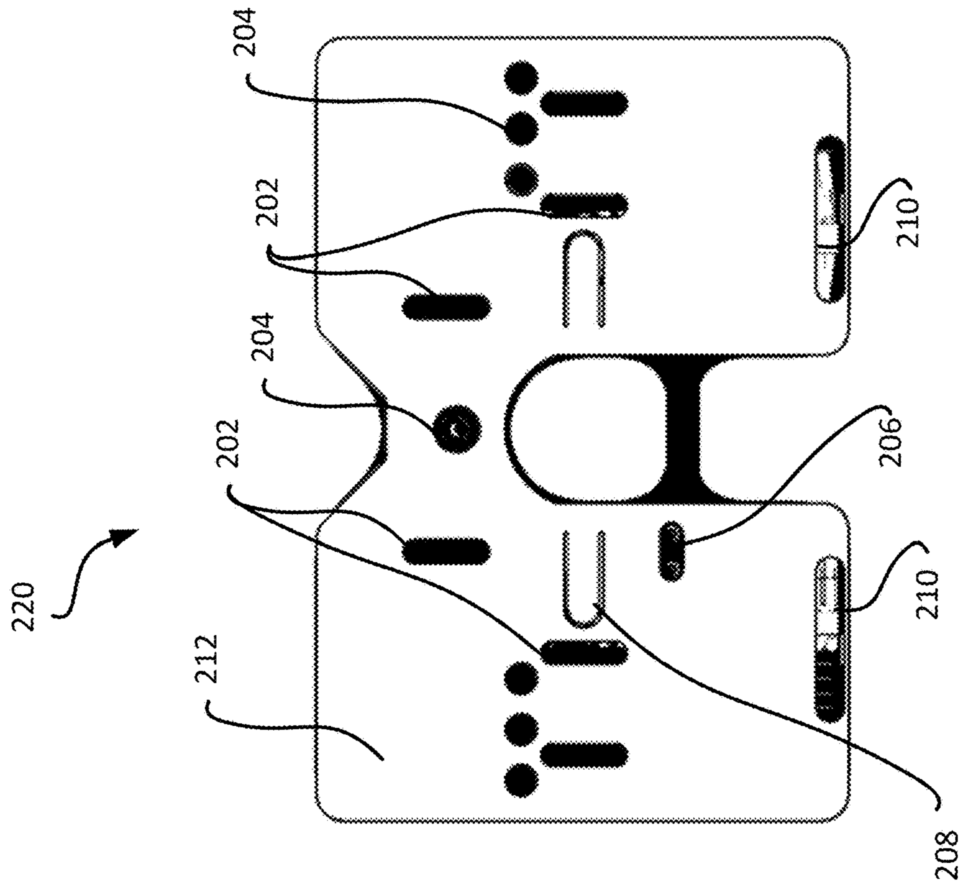
Figure 2C:
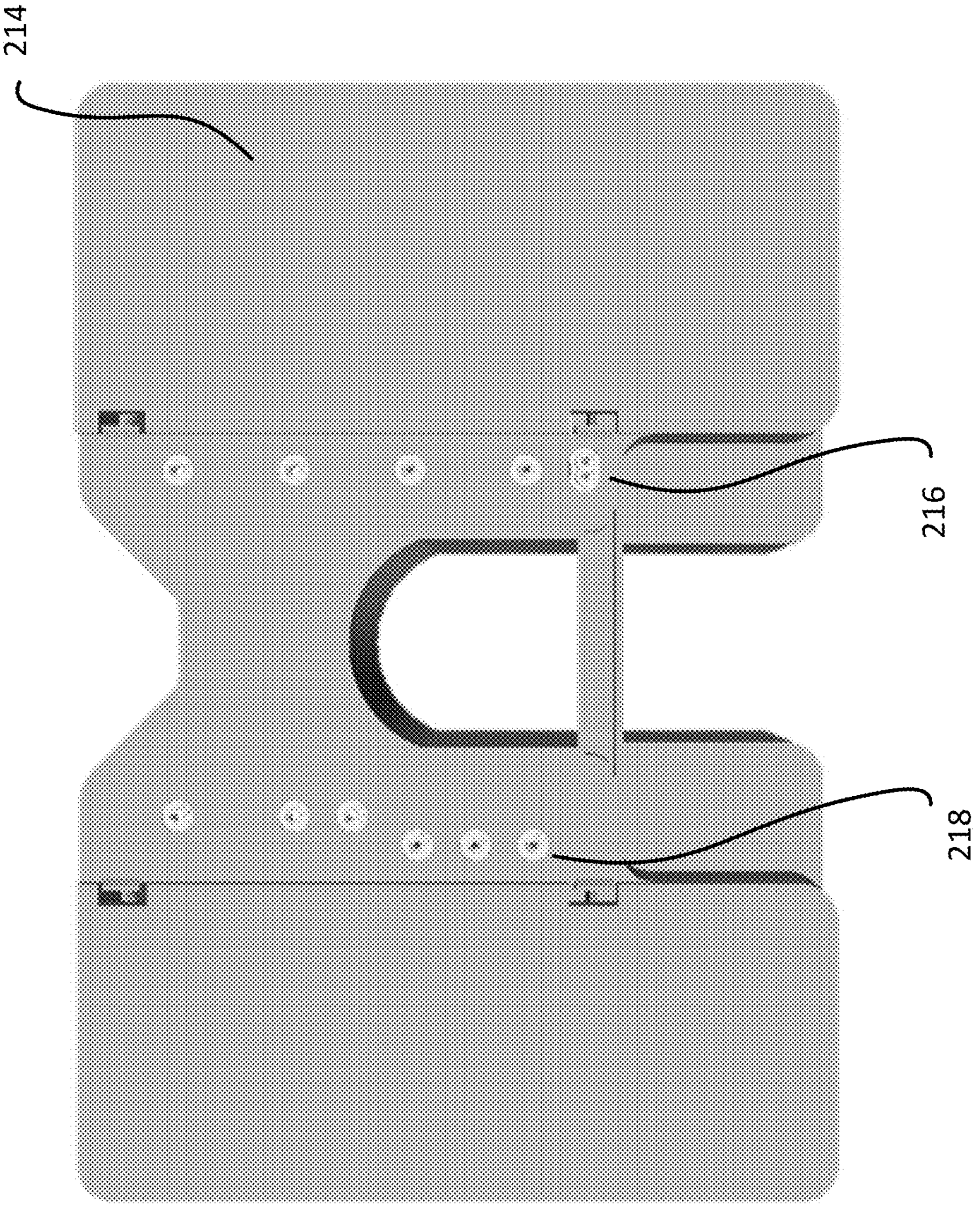

FIGS. 2A-2C illustrate an example of an integrated reagent cartridge (IRC) 220 of a sequencing system. The IRC 220 can serve as a sequencing reagent holder (optionally including a waste container for used reagent) prior to selection of a sequencing workflow. In some examples, the IRC 220 can hold between five and thirty different sequencing related reagents with volumes ranging from one to two-hundred milliliters, and a total volume up to six-hundred milliliters. The dimensions of the IRC 220 can be between forty and one-hundred-and-sixty millimeters in each direction or of other dimensions.

In some embodiments, the IRC 220 can include a cartridge housing with a top cover 212 and a bottom cover 214. The top cover 212 can interface with a base unit, such as the base unit 100 in FIG. 1. The bottom cover 214 can interface with an ISC, an example of which is further described in FIGS. 3A-3B. One or more reagent reservoirs for receiving or storing reagents can be disposed within the cartridge housing. The IRC 220 may additionally include a plurality of flow control valves to control a flow of fluids between reagent reservoirs to microfluidic channels of the ISC.

In the particular example shown in FIGS. 2A-2B, the top cover 212 includes one or more access ports 202, one or more reagent ports 204, a fluidic connection 206, one or more cantilever piercers 208, and one or more air ports 210. The access ports 202 can allow an actuator or actuators of the base unit to push down sealed reagent reservoirs within the IRC 220 to an opened state for reagent dispensing. The reagent ports 204 can receive reagents pipetted by a user into the IRC 220, allowing for customized reagent modification and/or addition. The fluidic connection 206 can connect a pump line from the base unit to the IRC 220. The cantilever piercers 208 can be actuated by the base unit, such that they pierce through a covering (e.g., foil) on the reagent reservoir within the cartridge housing for venting. Opening the reagent reservoir through actuation of the base unit can allow for reagent release. The air ports 210 can provide a path for the base unit to supply air inside the IRC 220. For example, air with constant temperature can be fed to the IRC 220 from a thermal control module of the base unit through the air ports 210, which allows for a suitable temperature environment for an on-board reagent when the IRC 220 is operated in the base unit.

In as the example shown in FIG. 2C, the bottom cover 214 of the IRC 220 includes a pump seal 216 and one or more reagent seals 218. The number of reagent seals 218 may be equal to the number of reagent reservoirs within the IRC 220. The pump seal 216 can provide a seal between the pump line in the IRC 220 to pump lines of the ISC. The reagent seals 218 can form a seal between the reagent reservoirs in the cartridge housing to reagent receiving ports of the ISC. The reagent seals 218 can function as fluidic connectors between the IRC 220 and the ISC, such that the IRC 220 can provide a sequencing reagent supply to sequencing reaction sites of the ISC. The pump seal 216 and reagent seals 218 may be rubber-based gaskets or another suitable material.

In some embodiments, the IRC 220 can additionally include a waste container within the cartridge housing. The waste container can receive fluids after the fluids are used in sequencing reactions in the ISC. Alternatively, the waste container can be external to the IRC 220, and the waste container can interface directly with a pump assembly of the base unit. A disposable pump may also be within the IRC 220 to fluidically connect the base unit and the ISC. Alternatively, the disposable pump may be a component of the ISC.

Figure 3A:
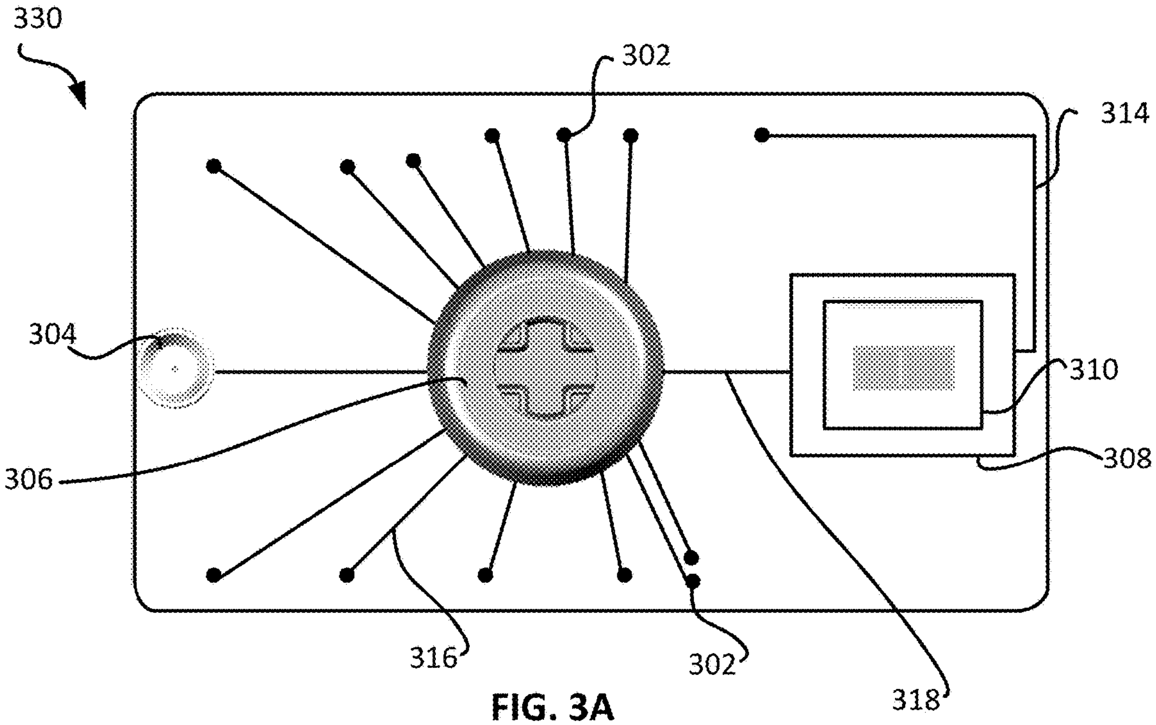
FIGS. 3A-3C illustrate example of an integrated sensor cartridge of a sequencing system.
Figure 3B:
Figure 3C:
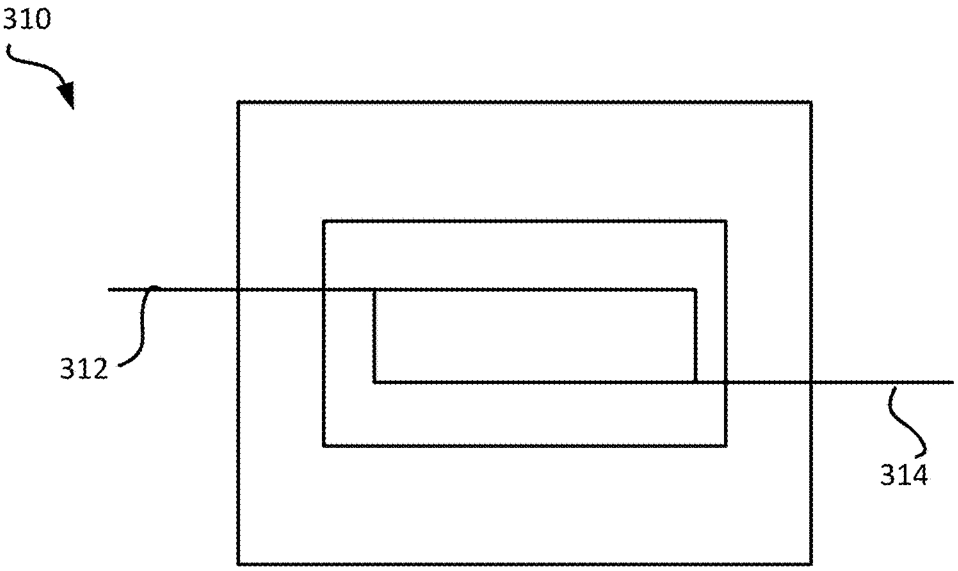

FIGS. 3A-3C illustrate example of an integrated sensor cartridge (ISC) 330 of a sequencing system. The ISC 330 can interface with a base unit, such as the base unit 100 in FIG. 1, and an IRC, such as the IRC 220 in FIGS. 2A-2B. The ISC 330 can include a fluidic network, a reagent select valve 306, and a biosensor assembly 308. The ISC 330 may additionally include a plurality of flow control valves on either side of the biosensor assembly 308 to control a flow of fluids between components of the sequencing system.

Referring to FIGS. 3A-3B, in some embodiments, the fluidic network of the ISC 330 includes a sample reservoir 304, a reaction chamber 310, one or more reagent receiving ports 302, and one or more fluidic channels 316. The sample reservoir 304 can receive a biological sample. The biological sample is a biological material (blood, urine, tissue, cell cultures, saliva, etc.) from a living or deceased organism (e.g., human, animal, etc.). The biological sample may be processed and purified DNA from the biological materials. In an example, the sample reservoir 304 can be an inverted dome feature capable of receiving a liquid volume between ten and two-hundred microliters. The inverted dome feature may minimize sample dead volume. The base unit can couple the reagent receiving ports 302 to fluidic connectors of the IRC to form a fluidic connection for each reagent. The ISC 330 may have a number of reagent receiving ports 302 equal to the number of reagent reservoirs and fluidic connectors in the IRC. The fluidic channels 316 can connect the sample reservoir 304 and reagent receiving ports 302 to the reaction chamber 310, which can include one or more sequencing reaction sites. While the ISC 330 of FIG. 3A illustrates one example of the fluidic channels 316, other examples may include a different number or arrangement of the fluidic channels.

The reagent select valve 306 can include valve ports, an output channel, and a bridge channel. The valve ports can provide a fluidic connection between the reagent receiving ports 302 and the reagent select valve 306. The output channel can fluidically connect the reagent select valve 306 to the reaction chamber 310 through a mainline 318. The bridge channel can fluidically couple a valve port of the valve ports to the output channel, such that a reagent from the reagent receiving ports 302 can be transmitted to the reaction chamber 310. The bridge channel may rotate to couple a particular valve port to the output channel depending on a sequencing workflow selected at the base unit. The rotation of the bridge channel can be controlled by the base unit.

Referring to FIG. 3C, in some embodiments, the reaction chamber 310 includes an opaque surface and at least one biosensor, which can be the same as the biosensor assembly 308, that is spaced apart from the opaque surface. The opaque surface can be a plastic material and, in some examples, the opaque surface can also be a biosensor surface. For example, the biosensor may form the bottom surface of the reaction chamber 310, and the opaque surface can be a cover slip covering the reaction chamber 310. In another example, both the bottom and top surfaces of the reaction chamber 310 may be biosensors and the opaque surface can be an outer coating or component. The biosensor (s) can be silicon-based complementary metal-oxide-semiconductor (CMOS) sensor(s) with a functionalized surface. In an example, the functionalized surface includes one or more active sensing areas. A width and/or length of the reaction chamber 310 can be between three and seventy millimeters, with a height ranging from fifty to two-hundred-and-fifty micrometers. Dimensions of the reaction chamber 310 may be adjusted based on different sequencing applications. For example, a user may select an ISC having a reaction chamber 310 and/or fluidics with one particular size and otherwise configured for a different ISC having a different sized reaction chamber or otherwise having a different configuration. A surface of the CMOS sensor(s) can be exposed in the reaction chamber 310 to provide binding sites for DNA of the biological sample to sequence. The opaqueness of the opaque surface can be achieved by either integrating a light shield feature (e.g., carbon dye in the plastic, or altering the surface roughness) or by attaching an additional light shield cover on the surface. Additionally, the reaction chamber 310 can include an inlet 312 and outlet 314. The inlet 312 can connect to a main line (318 in FIG. 3A) for accepting a sequencing reagent. The outlet 314 can connect to a waste line as a fluidic connection to an external pump source or waste container.

In some embodiments, the biosensor assembly 308 can include the biosensor(s) to detect a sequencing event. When a pixel of a biosensor detects light (e.g. bioluminescence, luminescence, or chemiluminescence resulting from a sequencing event), there will be a voltage spike or some other electrical occurrence in the pixel, which is connected to the LGA. The LGA includes a substrate with an array of electrical IO pads (e.g., wires and contact points) surrounding the reaction chamber 310, which are communicatively coupled to inputs in the base unit, such that the base unit can determine which pixels have detected the sequencing event. An analog signal detected by the biosensor(s) can be transmitted through the array of electrical IO pads to a sensor reads out module of the base unit. The temperature of the reaction chamber 310 may also be monitored, for instance by a thermistor, which can be transmitted through the array of electrical IO pads and read out by the base unit. This may provide real-time temperature monitoring and feedback to a thermal control module of the base unit. In an example, a central portion of the array of electrical IO pads can be a thermal conductive material (e.g., copper), such that a TEC module of the thermal control module can engage with the array of detectors and efficiently transfer thermal energy to the biosensor(s).

Figure 4B:
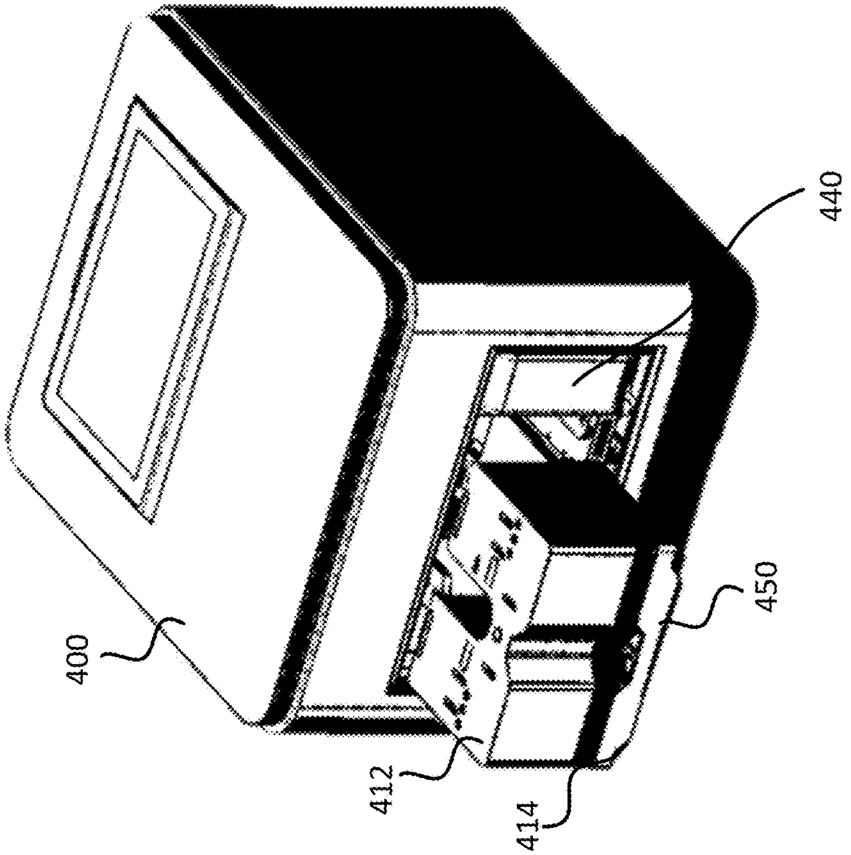
FIGS. 4A-4B illustrate an example of an integrated reagent cartridge and an integrated sensor cartridge positioned within a base unit.
Figure 4A:
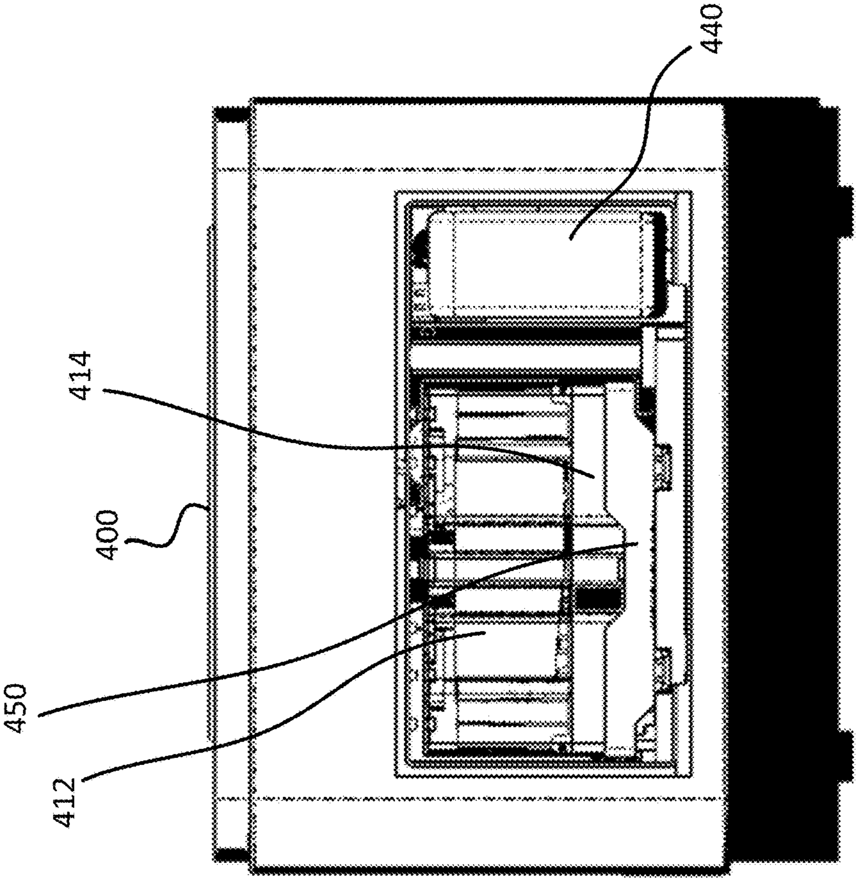

FIGS. 4A-4B illustrate an example of loading an integrated reagent cartridge (IRC) and an integrated sensor cartridge (ISC) into a base unit 400. A bottom cover 414 of the IRC can couple to an integrated sensor cartridge (ISC) (underneath the IRC) through a loading module 450 of the base unit 400. The loading module 450 may include one or more alignment pins for aligning the ISC and IRC properly. Once loaded, a top cover 412 of the IRC can engage with additional modules of the base unit 400. For example, a compressing module can control piercing the IRC and compressing the IRC and the ISC to form a closed fluidic line. In examples where the IRC does not include a waste reservoir, a waste container 440 can also be positioned within the base unit 400 during sequencing. The waste container 440 may be disposed within a cartridge housing of the IRC or as a standalone component that interfaces with a pump assembly of the base unit 400 (as shown in FIGS. 4A-4B).

Figure 5A:
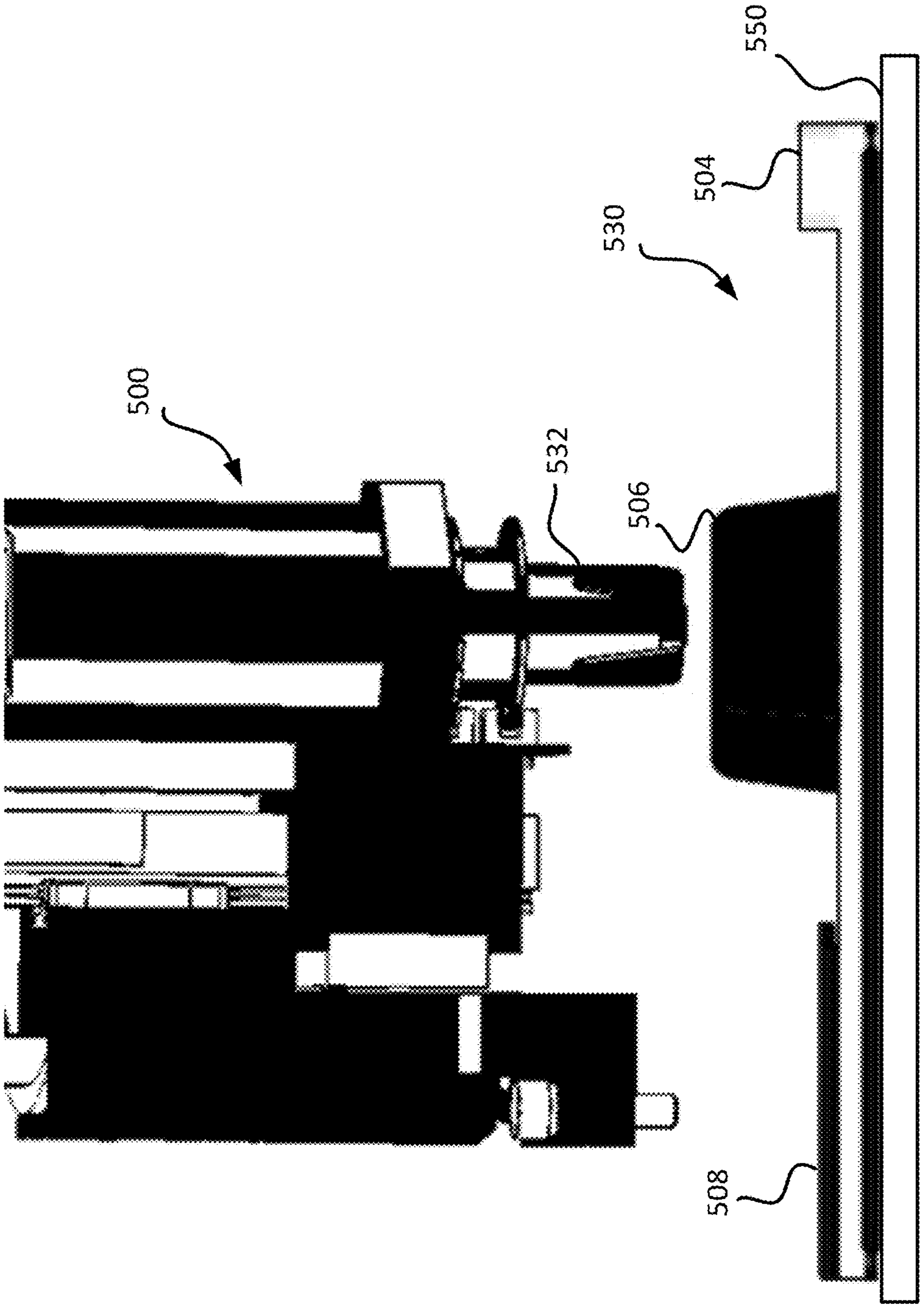
FIGS. 5A-5B illustrate an example of a base unit engaging with an integrated sensor cartridge.
Figure 5B:
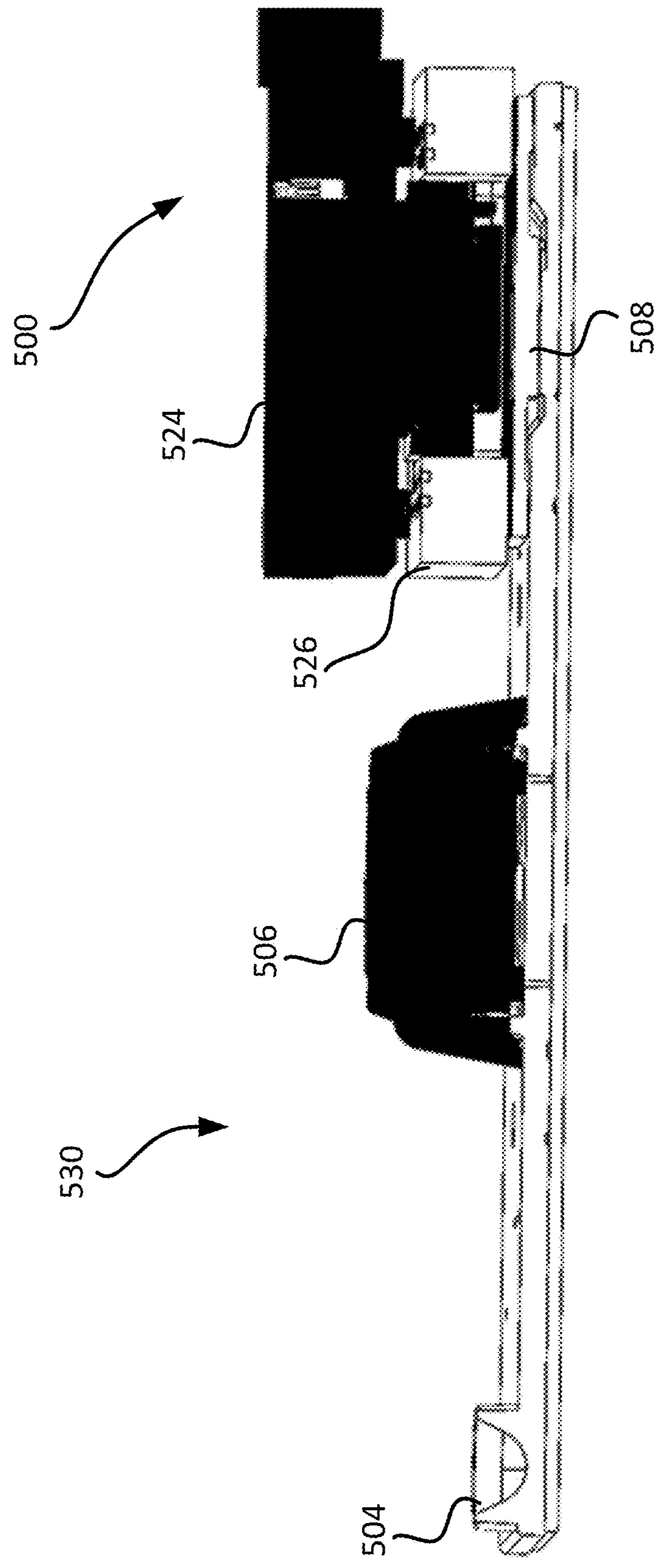

FIGS. 5A-5B illustrate an example of a base unit 500 engaging with an integrated sensor cartridge (ISC) 530. The base unit 500 can include a valve actuator 532 coupled to a motor and a loading module 550. The loading module 550 can include one or more alignment pins to allow for proper alignment of the ISC 530 within the base unit 500. During sequencing, the valve actuator 532 can couple with a reagent select valve 506. A reagent selection module of the base unit 500 can control an actuation force of the motor to control a rotation of the reagent select valve 506 to a particular position. The particular position can correspond to a fluidic connection from a reagent reservoir of an integrated reagent cartridge (IRC) to a reaction chamber positioned beneath a biosensor assembly 508. The particular position may be determined by the base unit 500 based on a sequencing setting selected at a controller module of the base unit 500. The reaction chamber can receive a biological sample from a sample reservoir 504 and a reagent from the reagent reservoir associated with the particular position. The biosensor assembly 508 can detect biological analytes during an interaction of the biological sample and the reagent and transmit a signal indicating the biological analytes to a sensor reads out module of the base unit 500.

Referring to FIG. 5B, the base unit 500 can additionally include a thermal control module 524 and a sensor reads out module 526. The sensor reads out module 526 can determine an analog signal from the sequencing and a temperature inside the reaction chamber. The sensor reads out module 526 can convert the analog signal to a digital format and transmit the digital signal with sequencing information and the temperature to a data storage and processing module of the base unit 500.

In some embodiments, the thermal control module 524 can receive a command from other modules of the base unit 500 to dynamically control the temperature of the reaction chamber. For example, when a sequencing workflow is selected at the controller module, the thermal control module 524 may provide a temperature ramping feature to the reaction chamber to set the reaction chamber to a suitable temperature. Additionally, during sequencing, the thermal control module 524 may receive a command from the data storage and processing module to adjust the temperature of the reaction chamber. The command may be determined based on the temperature read by the sensor reads out module 526 being outside a predefined range of temperatures. The thermal control module 524 can dynamically adjust a TEC temperature target based on the command.

Figure 6A:
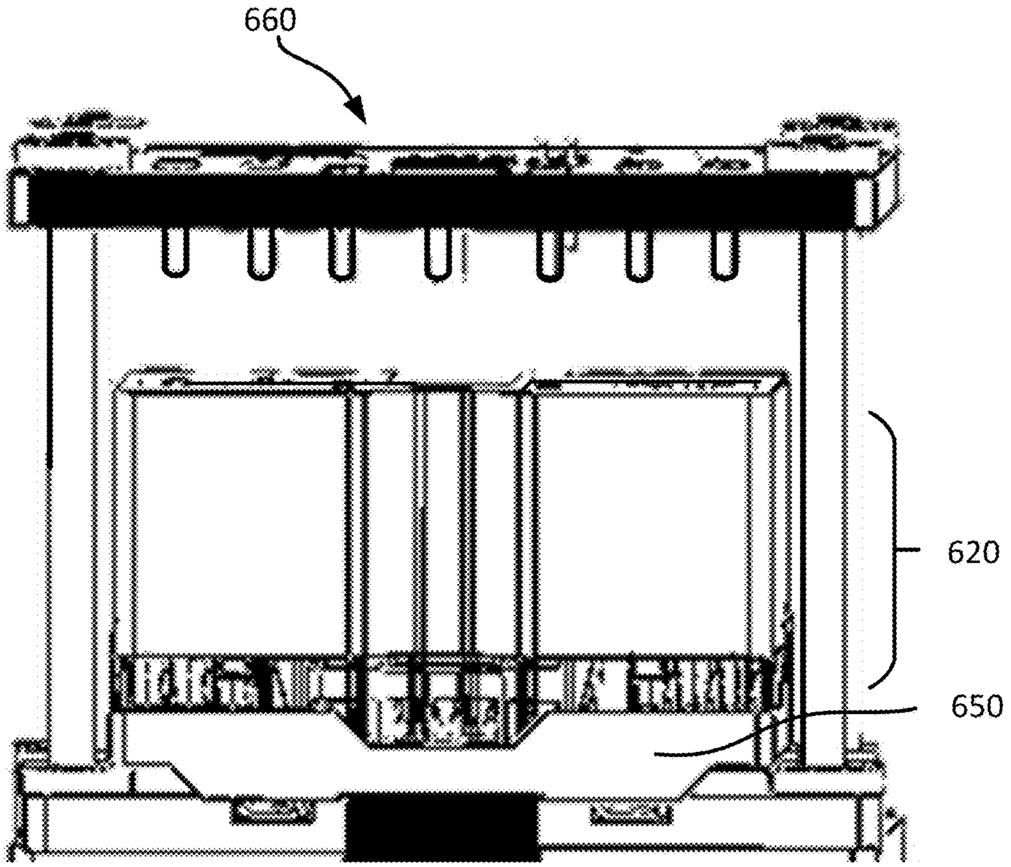
FIGS. 6A-6B illustrate an example of a base unit engaging an integrated reagent cartridge.
Figure 6B:
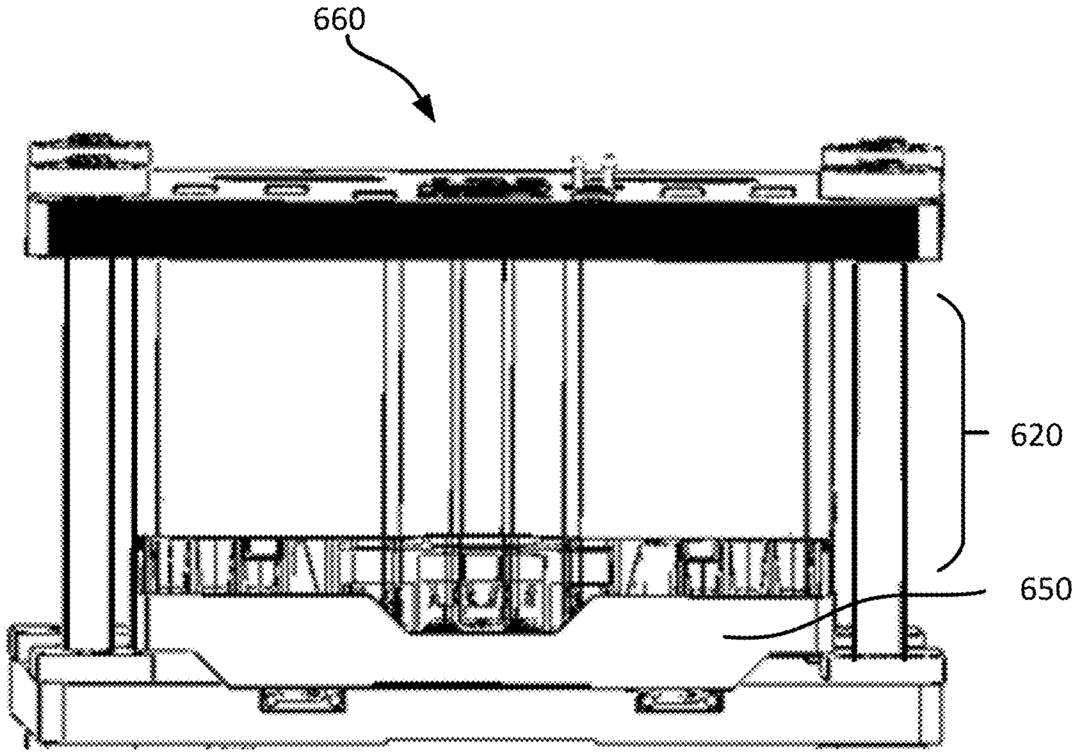

FIGS. 6A-6B illustrate an example of a base unit engaging an integrated reagent cartridge (IRC) 620. The IRC 620 can be loaded into the base unit on a loading module 650. After loading, the IRC can be positioned within a compressing module 660 of the base unit. In a non-compressing mode, as shown in FIG. 6A, the compressing module 660 can be at a height greater than the height of the IRC 620. During sequencing, the compressing module 660 can compress to pierce the IRC 620 and form a fluidic line between the base unit, the IRC 620, and an integrated sensor cartridge (ISC). FIG. 6B shows the compressing module 660 after compression.

In some embodiments, various components of the different embodiments described herein may be manufactured using injection-molding processes. Such processes may result in low-cost parts, and may make it cost-effective for the reagent cartridge is to be used as disposable consumables. Additionally, as a result of the IRC and ISC being separate from the base unit and each other, the IRC and ISC can be stored in respectively suitable conditions, such that the reagents and sensors have increased functionality in terms of both a sequencing accuracy and a lifespan.

Although framed in the context of biological samples generally the system described herein may be used in assays for nonbiological analytes. In one approach the system is used for any massively parallel assay in which an optical signal identifies a characteristic of the analyte.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. Furthermore, although elements of the disclosure may be described or claimed in the singular, the plural is contemplated unless limitation to the singular is explicitly stated.

What is claimed is:

1. A sequencing system, the system comprising:
(a) a removable integrated reagent cartridge (IRC), the IRC including a cartridge external housing enclosing one or more reservoirs for holding one or more sequencing reagents, the IRC further including one or more connectors in fluid communication with the one or more reservoirs, the one or more connectors comprising a plurality of reagent seals at the external housing and at least one pump line connector at the external housing;
(b) a removable integrated sensor cartridge (ISC), the ISC including:
(i) a plurality of reagent receiving ports, the reagent receiving ports located to fluidically connect to the reagent seals of the IRC when the IRC is brought into engagement with the ISC;
(ii) at least one biological sample input;
(iii) a reaction chamber including at least one sensor comprising a functionalized surface and an array of detectors configured to detect biological analytes on or near the functionalized surface;
(iv) a fluidic network configured to selectively fluidically connect the reagent receiving ports and biological sample input to the reaction chamber; and
(c) a base unit configured to removably receive the IRC and the ISC, wherein the IRC and ISC are configured to be compressed together when loaded into the base unit, the base unit configured to control sequencing reactions in the reaction chamber and to receive sequencing data from the sensor when the IRC and ISC are loaded into the base unit.

2. The sequencing system of claim 1, wherein the fluidic network further comprises a multi-position valve that selectively connects the reagent receiving ports and the biological sample input to the reaction chamber, wherein the base unit further comprises a valve actuator configured to actuate the multi-position valve.

3. The sequencing system of claim 2, wherein the multi-position valve comprises a plurality of valve ports fluidically connected to the reagent receiving ports and the biological sample input, an output channel fluidically connected to the reaction chamber; and a re-positionable bridge channel configured to fluidically couple one of the plurality of valve ports to the output channel.

4. The sequencing system of claim 1, wherein the biological sample input comprises a sample reservoir on the ISC configured to receive the biological sample.

5. The sequencing system of claim 1, wherein the reaction chamber further comprises an opaque surface spaced apart from the at least one sensor.

6. The sequencing system of claim 5, wherein the opaque surface of the reaction chamber comprises a second biosensor.

7. The sequencing system of claim 1, wherein the sensor further comprises a substrate including electrical contacts electrically coupled to the array of detectors, wherein the base unit further comprises an electrical connector assembly configured to electrically connect to the electrical contacts to receive sequencing data from the sensor.

8. The sequencing system of claim 1, wherein the IRC further comprises a waste container located within the cartridge external housing configured to receive used sequencing reagent.

9. The sequencing system of claim 1, wherein the system further comprises a separate waste container configured to receive used sequencing reagent.

10. The sequencing system of claim 1, wherein the base unit further comprises a pump assembly configured to fluidically connect to the ISC and the IRC.

11. The sequencing system of claim 1, wherein the IRC further comprises a disposable pump, wherein the base unit further comprises a pump actuator configured to engage the disposable pump.

12. The sequencing system of claim 1, wherein the reaction chamber comprises a plurality of reaction sites.

13. The sequencing system of claim 1, wherein the functionalized surface of the sensor comprises a plurality of active sensing areas.

14. The sequencing system of claim 13, wherein the sensor comprises a CMOS image sensor adjacent the functionalized surface.

15. The sequencing system of claim 1, wherein the base unit further comprises a cooling unit fluidically connected to the IRC configured to actively chill the reagents.

16. The sequencing system of claim 1, wherein the base unit further comprises a temperature control unit engaged to the ISC configured to control a temperature of the reaction chamber.

17. The sequencing system of claim 1, wherein the IRC further comprises at least one opening configured to receive at least one sequencing reagent.

18. The sequencing system of claim 1, wherein the base unit further comprises one or more actuators configured to open the one or more reservoirs of the IRC.

19. The sequencing system of claim 1, wherein the base unit is configured to compress the IRC and ISC together.

20. A sequencing system, the system comprising:
(a) a removable integrated reagent cartridge (IRC) configured to hold one or more sequencing reagents;
(b) a removable integrated sensor cartridge (ISC) comprising a reaction chamber and at least one valve, the reaction chamber including at least one sensor electrically connected to a plurality of electrical contacts; and (c) a base unit, the system configured for removable installation of the IRC and ISC in the base unit, the base unit comprising a valve actuator and an electric connector assembly, wherein the base unit is configured such that upon installation of the IRC and ISC in the base unit, the base unit compresses the IRC and ISC together such that the IRC is fluidically connected to the ISC, the valve actuator is operably engaged to the at least one valve of the ISC, and the electric connector assembly is electrically coupled to the plurality of electrical contacts of the ISC.

21. The sequencing system of claim 20, wherein the at least one valve of the ISC comprises a multi-position valve configured to selectively connect at least one of a plurality of reagent fluidic channels and a biological sample fluidic channel to the reaction chamber.

22. The sequencing system of claim 21, wherein at least one of the IRC and ISC further comprises a plurality of additional flow control valves, wherein the base unit further comprises at least one second valve actuator, and wherein the base unit is configured such that upon installation of the IRC and ISC in the base unit, the at least one second valve actuator is operably engaged to the plurality of additional flow control valves.

23. The sequencing system of claim 22, wherein at least one of the IRC and ISC further comprises a disposable pump, wherein the base unit further comprises a pump actuator, and wherein the base unit is configured such that upon installation of the IRC and ISC in the base unit, the pump actuator is operably engaged to the disposable pump.

* * * * *